US009604176B2

(12) United States Patent
Nagaoka et al.

(10) Patent No.: US 9,604,176 B2
(45) Date of Patent: Mar. 28, 2017

(54) EXHAUST GAS PURIFICATION SYSTEM AND EXHAUST GAS PURIFICATION METHOD

(71) Applicant: ISUZU MOTORS LIMITED, Tokyo (JP)

(72) Inventors: Daiji Nagaoka, Kamakura (JP); Teruo Nakada, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/432,090

(22) PCT Filed: Aug. 20, 2013

(86) PCT No.: PCT/JP2013/072144
§ 371 (c)(1),
(2) Date: Mar. 27, 2015

(87) PCT Pub. No.: WO2014/050362
PCT Pub. Date: Apr. 3, 2014

(65) Prior Publication Data
US 2015/0238902 A1    Aug. 27, 2015

(30) Foreign Application Priority Data

Sep. 28, 2012  (JP) ................................ 2012-215547

(51) Int. Cl.
| | |
|---|---|
| *B01D 53/94* | (2006.01) |
| *F01N 3/08* | (2006.01) |
| *F01N 3/035* | (2006.01) |
| *F01N 3/10* | (2006.01) |
| *F01N 3/025* | (2006.01) |
| *F01N 13/00* | (2010.01) |
| *F01N 3/20* | (2006.01) |
| *F01N 3/28* | (2006.01) |

(52) U.S. Cl.
CPC ..... *B01D 53/9477* (2013.01); *B01D 53/9431* (2013.01); *B01D 53/9495* (2013.01); *F01N 3/0253* (2013.01); *F01N 3/035* (2013.01); *F01N 3/0814* (2013.01); *F01N 3/0821* (2013.01); *F01N 3/0842* (2013.01); *F01N 3/0885* (2013.01); *F01N 3/103* (2013.01); *F01N 13/009* (2014.06); *F01N 13/0093* (2014.06); *F01N 13/0097* (2014.06); *B01D 53/944* (2013.01); *B01D 53/9422* (2013.01); *B01D 2255/1021* (2013.01); *B01D 2255/1023* (2013.01); *B01D 2255/1025* (2013.01); *B01D 2255/202* (2013.01); *B01D 2255/204* (2013.01); *B01D 2255/2022* (2013.01); *B01D 2255/2025* (2013.01); *B01D 2255/2027* (2013.01); *B01D 2255/2092* (2013.01); *B01D 2255/20707* (2013.01); *B01D 2255/50* (2013.01); *B01D 2258/012* (2013.01); *F01N 3/2066* (2013.01); *F01N 3/2828* (2013.01); *F01N 2370/04* (2013.01); *F01N 2560/026* (2013.01); *F01N 2560/06* (2013.01); *F01N 2560/14* (2013.01); *F01N 2610/03* (2013.01); *Y02T 10/24* (2013.01)

(58) Field of Classification Search
None
See application file for complete search history.

(56) References Cited

U.S. PATENT DOCUMENTS

| | | | |
|---|---|---|---|
| 2005/0178110 A1* | 8/2005 | Mital | .................... F01N 13/011 60/286 |
| 2008/0120971 A1 | 5/2008 | Nagaoka et al. | |
| 2009/0025375 A1* | 1/2009 | Poojary | ................. F01N 3/0842 60/295 |
| 2011/0056265 A1* | 3/2011 | Yacoub | ............... F02D 41/1454 73/1.16 |

FOREIGN PATENT DOCUMENTS

| | | | |
|---|---|---|---|
| EP | 1 834 690 | | 9/2007 |
| EP | 1 949 959 A1 | | 7/2008 |
| EP | 1152140 | * | 7/2011 |
| JP | 10-47042 | | 2/1998 |
| JP | 10-205326 | | 8/1998 |

(Continued)

OTHER PUBLICATIONS

International Search Report mailed on Nov. 19, 2013 in corresponding International Patent Application No. PCT/JP2013/072144.
Patent Abstracts of Japan, Publication No. 2000-167356, published Jun. 20, 2000.
Patent Abstracts of Japan, Publication No. 2009-221913, published Oct. 1, 2009.
Patent Abstracts of Japan, Publication No. 2006-150258, published Jun. 15, 2006.
Patent Abstracts of Japan, Publication No. 2003-245523, published Sep. 2, 2003.
Patent Abstracts of Japan, Publication No. 10-47042, published Feb. 17, 1998.
Patent Abstracts of Japan, Publication No. 10-205326, published Aug. 4, 1998.

(Continued)

*Primary Examiner* — Melvin C Mayes
*Assistant Examiner* — Sheng H Davis
(74) *Attorney, Agent, or Firm* — Staas & Halsey LLP (57) ABSTRACT

A high-temperature NOx occlusion reduction type catalyst in which an NOx occlusion material containing an alkali metal is supported, and a low-temperature NOx occlusion reduction type catalyst in which an NOx occlusion material containing an alkaline earth metal is supported, are disposed in series on an upstream side and a downstream side, respectively, of an exhaust gas purification system. An oxidation catalyst is disposed on an upstream side of the high-temperature NOx occlusion reduction type catalyst. The desulfurization of the NOx occlusion reduction type catalysts is facilitated, and the NOx reduction efficiency is improved by the partial oxidation of hydrocarbons in the exhaust gas, while a wide NOx active temperature window is achieved.

8 Claims, 4 Drawing Sheets

(56) References Cited

FOREIGN PATENT DOCUMENTS

| JP | 2000-126554 | 5/2000 |
| JP | 2000-167356 | 6/2000 |
| JP | 2003-245523 | 9/2003 |
| JP | 2006-150258 | 6/2006 |
| JP | 2009-221913 | 10/2009 |
| WO | WO 2006/059471 A1 | 6/2006 |
| WO | 2011124357 | * 10/2011 |

OTHER PUBLICATIONS

Extended European Search Report dated Jun. 24, 3016 in corresponding European Patent Application No. 13842248.0.

* cited by examiner

EXHAUST GAS PURIFICATION SYSTEM AND EXHAUST GAS PURIFICATION METHOD

CROSS-REFERENCE TO RELATED APPLICATIONS

This application is a U.S. National Stage Application, which claims the benefit under 35 U.S.C. §371 of PCT International Patent Application No. PCT/JP2013/072144, filed Aug. 20, 2013, which claims the foreign priority benefit under 35 U.S.C. §119 of Japanese Patent Application No. 2012-215547, filed Sep. 28, 2012, the contents of which are incorporated herein by reference.

TECHNICAL FIELD

The present invention relates to an exhaust gas purification system and an exhaust gas purification method which make it possible to effectively conduct desulfurization of a nitrogen oxides ("NOx") occlusion reduction type catalyst, which is one of the lean NOx trap catalysts, and reduction of NOx in exhaust gas

BACKGROUND ART

Various researches and proposals have been made for NOx catalysts for removing NOx by reduction from exhaust gas of internal combustion engines such as diesel engines and some types of gasoline engines and various combustion apparatuses. The de-NOx catalysts include lean NOx trap catalysts (LNT catalysts), selective catalytic reduction catalysts (SCR catalysts), and the like. The NOx occlusion reduction type catalyst is one of the lean NOx trap catalysts.

In the NOx occlusion reduction type catalyst, a catalytic metal and a NOx occlusion material which occludes NOx are supported. A basic structure of the NOx occlusion reduction type catalyst is formed by supporting a NOx occlusion material (NOx occlusion substance) having a function to occlude and release NOx and a catalytic metal which promotes the redox reaction on a catalyst support such as alumina. Examples of the NOx occlusion material include alkaline earth metals such as barium (Ba), alkali metals such as potassium (K), and the like. Meanwhile, examples of the catalytic metal include noble metals such as platinum (Pt), rhodium (Rh), and palladium (Pd).

The NOx occlusion reduction type catalyst operates as follows. Specifically, when the air-fuel ratio of the in-flow exhaust gas is in a lean (excess oxygen) state, and oxygen ($O_2$) is present in the atmosphere, nitrogen monoxide (NO) in the exhaust gas is oxidized to nitrogen dioxide ($NO_2$) on the metal catalyst, and the nitrogen dioxide is bound to the NOx occlusion material to forma nitrate ($Ba_2NO_4$) or the like and is occluded.

Meanwhile, when the air-fuel ratio of the exhaust gas flowing into the NOx occlusion reduction type catalyst becomes the theoretical air-fuel ratio or takes a rich (low oxygen concentration) state and the oxygen concentration in the atmosphere decreases, the NOx occlusion material such as barium is bonded to carbon monoxide (CO), which causes the decomposition of the nitrate and release of nitrogen dioxide. The released nitrogen dioxide is reduced to nitrogen ($N_2$) with unburned hydrocarbons (HCs), carbon monoxide, or the like contained in the exhaust gas by the three-way function of the catalytic metal, so that components in the exhaust gas are released to the air in the form of harmless substances such as carbon dioxide ($CO_2$), water ($H_2O$), and nitrogen.

An exhaust gas purification system including a NOx occlusion reduction type catalyst performs a rich control (NOx regeneration operation) for recovering the NOx occlusion performance, when the NOx occlusion performance approaches its saturation. In the rich control, the occluded NOx is released by making the air-fuel ratio of the exhaust gas rich to lower the oxygen concentration in the in-flow exhaust gas, and the released NOx is reduced with the catalytic metal.

Here, NOx occlusion reduction type catalysts are classified into low-temperature NOx occlusion reduction type catalysts having high low-temperature activity and high-temperature NOx occlusion reduction type catalysts having high high-temperature activity, according to the characteristics of the NOx occlusion material.

In the low-temperature NOx occlusion reduction type catalyst, a NOx occlusion material mainly composed of an alkaline earth metal such as barium, which does not inhibit the activity of the catalytic metal, is used. Hence, the activity of the catalytic metal is not inhibited, and the NOx reduction performance at low temperature is excellent. However, the use of an alkaline earth metal presents a problem of decrease in NOx occlusion performance at high temperature.

On the other hand, the occlusion material used in the high-temperature NOx occlusion reduction type catalyst is an alkali metal such as potassium, which has characteristics contrary to those of alkaline earth metals such as barium. The alkali metal has high NOx occlusion performance at high temperature. However, the alkali metal inhibits the activity of a noble metal (oxidation catalyst) at low temperature, and hence presents a problem of decrease in the NOx reduction performance in a low-temperature region.

In addition, the NOx occlusion reduction type catalyst also has a problem of decrease in the NOx removal ratio due to thermal degradation (mainly, sintering). The low-temperature NOx occlusion reduction type catalyst undergoes a very slight decrease in the NOx removal ratio due to the thermal degradation in a low-temperature region (around 200° C.), but a gradual decrease in the NOx removal ratio in a high-temperature region (around 500° C.) This is because the NOx occlusion performance is effectively utilized in the low-temperature region, and hence the low-temperature NOx occlusion reduction type catalyst is not susceptible to the influence of the decrease in the occlusion efficiency due to the decrease in the activity for "NO→$NO_2$" caused by deterioration of the noble metal.

In contrast, the high-temperature NOx occlusion reduction type catalyst undergoes a very slight decrease in the NOx removal ratio due to thermal degradation in the high-temperature region (around 500° C.), but a sharp decrease in the NOx removal ratio in the low-temperature region (around 200° C.)

With these thermal degradation characteristics taken into consideration, an exhaust gas purification system has to be designed so that the system, as a whole, can effectively conduct the NOx removal in a state with a small influence of the thermal degradation from the low-temperature region to the high-temperature region.

Considering these things, attempts to widen the temperature window of a NOx occlusion reduction type catalyst have been proposed as described in, for example, Japanese patent application Kokai publication No. Hei 10-47042, Japanese patent application Kokai publication No. 2000-167356, and Japanese patent application Kokai publication No. Hei 10-205326. Specifically, an exhaust gas purification system and an exhaust gas purification apparatus are proposed in which a high-temperature NOx occlusion reduction type catalyst on an upstream side and a low-temperature NOx occlusion reduction type catalyst on a downstream side are arranged in an exhaust passage. In addition, an exhaust gas purification catalyst apparatus for an internal combustion engine is proposed in which multiple catalysts having different NOx active temperature ranges in a lean atmosphere are arranged in series in close contact with each other, and a catalyst with a higher NOx active temperature range has a relatively larger catalyst volume and is arranged on an more upstream side.

Moreover, as described in, for example, Japanese patent application Kokai publication No. 2006-150258, the following NOx purification system is proposed to provide a NOx purification system having a wide NOx active temperature window. Specifically, in the NOx purification system, a high temperature-type NOx occlusion reduction type catalyst located on an upstream side and having a NOx occlusion material containing an alkali metal supported therein and a low temperature-type NOx occlusion reduction type catalyst located on a downstream side and having a NOx occlusion material containing an alkaline earth metal supported therein are arranged in series, and the mole ratio of platinum to rhodium of the NOx occlusion material supported on the high temperature-type NOx occlusion reduction type catalyst is set in a range from 2:1 to 1:2, both inclusive.

In addition, the NOx occlusion reduction type catalyst has the following problem. Specifically, the NOx occlusion material occludes SOx (sulfur oxides), as well as NOx. Hence, the ability to occlude NOx decreases with the increase in the amount of SOx occluded, and the NOx removal performance decreases. Since SOx is bonded to the NOx occlusion material with a greater force than NOx, desulfurization is not easy. For the desulfurization, the exhaust gas around the catalyst has to be at a high temperature and in a rich atmosphere. It is difficult to achieve the conditions of the atmosphere under operation conditions of a diesel engine, which is operated on a lean fuel in an ordinary state.

In addition, for a desulfurization control of a NOx occlusion reduction type catalyst provided alone, hydrocarbons (HCs) are supplied into the exhaust gas, and the amount of exhaust gas and the amount of the hydrocarbons supplied are controlled so that the air-fuel ratio of the exhaust gas can be stoichiometric. In contrast, in a case of the exhaust gas purification system provided with both high-temperature and low-temperature NOx occlusion reduction type catalysts, the hydrocarbons in the exhaust gas are combusted with the upstream high-temperature NOx occlusion reduction type catalyst to consume oxygen in the exhaust gas. Hence, the entire downstream low-temperature NOx occlusion reduction type catalyst is placed under a rich atmosphere which enables the desulfurization, and the desulfurization is promoted.

However, oxygen still remains in the exhaust gas flowing into the upstream high-temperature NOx occlusion reduction type catalyst. Hence, it is difficult to desulfurize the high-temperature NOx occlusion reduction type catalyst, especially at a front portion thereof, and this presents a problem of decrease in the NOx removal performance.

In addition, in a NOx occlusion reduction type catalyst, hydrocarbons or carbon monoxide is supplied as a reducing agent during the rich reduction. This presents a problem in that HC slip may occur in which part of the hydrocarbons and carbon monoxide passes through the NOx occlusion reduction type catalyst and is released to the air.

PRIOR ART DOCUMENT

Patent Document 1: Japanese patent application Kokai publication No. Hei 10-47042
Patent Document 2: Japanese patent application Kokai publication No. 2000-167356
Patent Document 3: Japanese patent application Kokai publication No. Hei 10-205326
Patent Document 4: Japanese patent application Kokai publication No. 2006-150258

SUMMARY OF THE INVENTION

The present invention has been made to solve the above-described problems, and an object of the present invention is to provide the following exhaust gas purification system and exhaust gas purification method. Specifically, in an exhaust gas purification system in which NOx occlusion reduction type catalysts are used for removing NOx in exhaust gas, the compositions and arrangement (lay out) of the NOx occlusion reduction type catalysts are designed with ingenuity, so that the desulfurization of the NOx occlusion reduction type catalysts can be facilitated, and the NOx reduction efficiency can be improved by the partial oxidation of hydrocarbons in the exhaust gas, while a wide NOx active temperature window is achieved.

An exhaust gas purification system to achieve the above-described object is an exhaust gas purification system including NOx occlusion reduction type catalysts each having a catalytic metal and a NOx occlusion material which occludes NOx when an air-fuel ratio of exhaust gas is in a lean state and releases the occluded NOx when the air-fuel ratio is in a rich state, wherein a high-temperature NOx occlusion reduction type catalyst in which a NOx occlusion material containing an alkali metal is supported and a low-temperature NOx occlusion reduction type catalyst in which a NOx occlusion material containing an alkaline earth metal is supported are disposed in series on an upstream side and a downstream side, respectively, and an oxidation catalyst is disposed on an upstream side of the high-temperature NOx occlusion reduction type catalyst.

Note that, regarding the arrangement of the oxidation catalyst (DOC), an oxidation catalyst converter may be provided on an upstream side of the high-temperature NOx occlusion reduction type catalyst, or an oxidation catalyst may be provided on an upstream side of the high-temperature NOx occlusion reduction type catalyst by zone coating in which portions of a catalyst layer are coated with different materials.

In this configuration, the oxidation catalyst is disposed on an upstream side of the high-temperature NOx occlusion reduction type catalyst. Hence, oxygen in the exhaust gas can be consumed in the oxidation catalyst, so that the entire exhaust gas flowing into the high-temperature NOx occlusion reduction type catalyst and the low-temperature NOx occlusion reduction type catalyst can be placed under a rich atmosphere which enables desulfurization. For this reason, the desulfurization of the high-temperature NOx occlusion reduction type catalyst and the low-temperature NOx occlusion reduction type catalyst can be promoted. Consequently, this facilitates the desulfurization of both the high-temperature NOx occlusion reduction type catalyst and the low-temperature NOx occlusion reduction type catalyst, and the reduction efficiency can be improved by the partial oxidation of hydrocarbons, i.e., by the incomplete combustion of hydrocarbons with an oxygen concentration being lower than the theoretical oxygen amount necessary for complete combustion.

Note that, considering the rich reduction, it is necessary to deliver the reducing agent such as hydrocarbons to the NOx occlusion reduction type catalysts. Hence, it is preferable that the HC oxidation performance of the oxidation catalyst be not so high. The employment of the above-described configuration makes it possible to reduce the amount of the noble metal supported in the oxidation catalyst, which is advantageous in terms of costs. Moreover, the composition of the oxidation catalyst can be adjusted to be specialized for the partial decomposition of hydrocarbons, and made more suitable for the rich reduction, so that the reduction efficiency especially at low temperature can be improved.

In the above-described exhaust gas purification system, a catalyzed diesel particulate filter ("DPF") is disposed on a downstream side of the low-temperature NOx occlusion reduction type catalyst. In this case, the catalyzed DPF (CSF: catalyzed soot filter) can remove the hydrocarbons in the exhaust gas by the HC oxidation function of the noble metal and the HC adsorption function of the HC adsorption material such as zeolite or ceria. Because of these functions, the HC slip can be prevented in which hydrocarbons are released to the air when the air-fuel ratio of the exhaust gas is under a rich state, and the temperature can be sufficiently raised by the heat of oxidation of the hydrocarbons during the PM regeneration in which PMs (particulate matters) trapped by the catalyzed DPF are removed by combustion.

Note that when the oxidation catalyst and the catalyzed DPF are disposed upstream of the NOx occlusion reduction type catalyst in this order from the upstream side, the oxidation catalyst has to have a sufficient HC oxidation performance to raise the temperature for the PM regeneration in the catalyzed DPF. With this configuration, the NOx reduction performance of the NOx occlusion reduction type catalyst is lowered, because the reducing agent for the rich reduction is consumed at the oxidation catalyst.

Accordingly, to keep the NOx removal performance at a high level, the catalyzed DPF is preferably disposed on a downstream side of the NOx occlusion reduction type catalyst. In this case, the oxidation catalyst and the NOx occlusion reduction type catalysts are present upstream of the catalyzed DPF, and hence can together sufficiently raise the temperature of the exhaust gas.

In the exhaust gas purification system, upstream-side hydrocarbon addition device is disposed upstream of the high-temperature NOx occlusion reduction type catalyst, and a downstream-side NOx sensor is disposed downstream of the low-temperature NOx occlusion reduction type catalyst. With this configuration, the following effect can be achieved.

With this configuration, the upstream-side hydrocarbon addition device can supply a reducing agent, which is hydrocarbons, during a rich control to improve the NOx reduction efficiency in each of the NOx occlusion reduction type catalysts, and can supply hydrocarbons during the PM regeneration to raise the temperature of the catalyst supported in the catalyzed DPF by the heat of oxidation of the hydrocarbons and to promote the combustion of PMs. Especially in the low-temperature region, the NOx reduction efficiency can be improved by promoting the decomposition of hydrocarbons. Note that the upstream-side hydrocarbon addition device can be achieved by a hydrocarbon injection nozzle, a hydrocarbon feed valve, post injection in the in-cylinder fuel injection in an internal combustion engine, or the like.

Regarding the addition of the hydrocarbons, if light oil (fuel) serving as the hydrocarbons is directly injected into the exhaust gas, it takes time before drops of the liquid of the light oil are gasified, and undergo phase transition to HC species readily used as the reducing agent in the catalyst especially in the low-temperature region (approximately 230° C. or below). In this respect, by employing the two-stage arrangement of the NOx occlusion reduction type catalysts, the hydrocarbons can be caused to pass through the oxidation catalyst and the high-temperature NOx occlusion reduction type catalyst, before reaching the low-temperature NOx occlusion reduction type catalyst. Hence, the exhaust gas containing the light oil is in contact with the catalysts for a relatively long time, so that a sufficient time for the light oil to be gasified can be provided reliably.

Consequently, NOx can be reduced efficiently even at relatively low temperature (approximately 200° C. to 230° C.), which is advantageous in that the NOx removal ratio can be improved. In addition, since the NOx concentration in the exhaust gas having passed through the catalyst can be measured with the NOx sensor, the NOx concentration can be used for the rich control or diagnosis with an on-board diagnostic system (OBD).

In the above-described exhaust gas purification system, high-temperature hydrocarbon addition device is disposed on an upstream side of the high-temperature NOx occlusion reduction type catalyst; a low-temperature hydrocarbon addition device is disposed between the high-temperature NOx occlusion reduction type catalyst and the low-temperature NOx occlusion reduction type catalyst; a first NOx sensor is provided immediately after the high-temperature NOx occlusion reduction type catalyst; a second NOx sensor is provided immediately after the low-temperature NOx occlusion reduction type catalyst; and the exhaust gas purification system includes a hydrocarbon supply controller for controlling the high-temperature hydrocarbon addition device and the low-temperature hydrocarbon addition device. In addition, the hydrocarbon supply controller is configured such that when a temperature of the exhaust gas flowing into the oxidation catalyst is lower than a first determination temperature, a hydrocarbon is supplied only from the low-temperature hydrocarbon addition device and a feedback control of the amount of the hydrocarbon supplied is conducted by using a value detected by the second NOx sensor; when the temperature of the exhaust gas flowing into the oxidation catalyst is not lower than the first determination temperature but lower than a second determination temperature, a hydrocarbon is supplied from the high-temperature hydrocarbon addition device and a feedback control of the amount of the hydrocarbon supplied is conducted by using a value detected by the first NOx sensor, and also a hydrocarbon is supplied from the low-temperature hydrocarbon addition device and a feedback control of the amount of the hydrocarbon supplied is conducted by using a value detected by the second NOx sensor; and when the temperature of the exhaust gas flowing into the oxidation catalyst is not lower than the second determination temperature, a hydrocarbon is supplied only from the high-temperature hydrocarbon addition device and a feedback control of the amount of the hydrocarbon supplied is conducted by using a value detected by the first NOx sensor. With this configuration, the following effect can be achieved.

This configuration enables an optimum control for each of the NOx occlusion reduction type catalysts, and independent NOx reduction can be conducted in a temperature region suitable for each of the NOx occlusion reduction type catalysts. Hence, the NOx removal ratio can be improved, and the HC slip can be reduced. Note that the upstream-side hydrocarbon addition device may be used instead of the high-temperature hydrocarbon addition device, and the downstream-side NOx sensor may be used instead of the second NOx sensor.

In addition, an exhaust gas purification method to achieve the above-described object is an exhaust gas purification method including purifying exhaust gas in a NOx purification system including NOx occlusion reduction type catalysts each having a catalytic metal and a NOx occlusion material which occludes NOx when an air-fuel ratio of exhaust gas is in a lean state and releases the occluded NOx when the air-fuel ratio is in a rich state, characterized in that the exhaust gas is purified by allowing the exhaust gas to pass through an oxidation catalyst, then through a high-temperature NOx occlusion reduction type catalyst in which a NOx occlusion material containing an alkali metal is supported, and then through a low-temperature NOx occlusion reduction type catalyst in which a NOx occlusion material containing an alkaline earth metal is supported.

In this method, oxygen in the exhaust gas can be consumed at the oxidation catalyst by causing the exhaust gas to pass through the oxidation catalyst before the high-temperature NOx occlusion reduction type catalyst. Hence, the entire exhaust gas flowing into the high-temperature NOx occlusion reduction type catalyst and the low-temperature NOx occlusion reduction type catalyst can be placed in a rich atmosphere which enables desulfurization. For this reason, desulfurization of the high-temperature NOx occlusion reduction type catalyst and the low-temperature NOx occlusion reduction type catalyst can be promoted. Consequently, the desulfurization of both the high-temperature NOx occlusion reduction type catalyst and the low-temperature NOx occlusion reduction type catalyst is facilitated, and the reduction efficiency can be improved by the partial oxidation of hydrocarbons in the exhaust gas.

In the above-described exhaust gas purification method, the exhaust gas is purified by allowing the exhaust gas having passed through the low-temperature NOx occlusion reduction type catalyst to pass through a catalyzed DPF. In this case, the HC slip in which the hydrocarbons are released to the air when the air-fuel ratio of the exhaust gas is rich can be prevented, because the catalyzed DPF has a function to remove hydrocarbons in exhaust gas. In addition, the temperature of the catalyzed DPF can be sufficiently raised at the PM regeneration of the catalyzed DPF by the exhaust gas whose temperature is raised by passing through the oxidation catalyst, the high-temperature NOx occlusion reduction type catalyst, and the low-temperature NOx occlusion reduction type catalyst. Hence, the PMs can be removed by combustion efficiently.

In the above-described exhaust gas purification method, when a hydrocarbon is supplied from an upstream-side hydrocarbon addition device disposed upstream of the high-temperature NOx occlusion reduction type catalyst, the amount of the hydrocarbon supplied is being controlled by using a value detected by a downstream-side NOx sensor disposed downstream of the low-temperature NOx occlusion reduction type catalyst. In this case, the following effect can be achieved.

This method makes it possible to raise the temperature of the supported catalyst by supplying a hydrocarbon during the PM regeneration from the upstream-side hydrocarbon addition means such as a HC feed valve or post injection in in-cylinder fuel injection in an internal combustion engine. Hence, the decomposition of the hydrocarbon can be promoted especially in the low-temperature region, and the reduction efficiency can be improved. In addition, the hydrocarbon passes through the oxidation catalyst and the high-temperature NOx occlusion reduction type catalyst, before reaching the low-temperature NOx occlusion reduction type catalyst. Hence, the exhaust gas is in contact with the catalysts for a relatively long time, and a sufficient time for the hydrocarbon added to the exhaust gas to be gasified can be provided reliably.

Consequently, NOx can be reduced even at relatively low temperature (approximately 200° C. to 230° C.), which is advantageous in that the NOx removal ratio is improved. In addition, the NOx concentration after the catalyst system can be measured with the NOx sensor. Hence, the NOx concentration can be used for a rich control or diagnosis of an OBD (on-board diagnostic system).

In the above-described exhaust gas purification method, when a temperature of the exhaust gas flowing into the oxidation catalyst is lower than a first determination temperature, a hydrocarbon is supplied only from low-temperature hydrocarbon addition device disposed between the high-temperature NOx occlusion reduction type catalyst and the low-temperature NOx occlusion reduction type catalyst and a feedback control of the amount of the hydrocarbon supplied is conducted by using a NOx concentration downstream of the low-temperature NOx occlusion reduction type catalyst; when the temperature of the exhaust gas flowing into the oxidation catalyst is not lower than the first determination temperature but lower than a second determination temperature, a hydrocarbon is supplied from a high-temperature hydrocarbon addition device provided on an upstream side of the high-temperature NOx occlusion reduction type catalyst and a feedback control of the amount of the hydrocarbon supplied is conducted by using a NOx concentration downstream of the high-temperature NOx occlusion reduction type catalyst, and also a hydrocarbon is supplied from the low-temperature hydrocarbon addition device and a feedback control of the amount of the hydrocarbon supplied is conducted by using a NOx concentration downstream of the low-temperature NOx occlusion reduction type catalyst; and when the temperature of the exhaust gas flowing into the oxidation catalyst is not lower than the second determination temperature, a hydrocarbon is supplied only from the high-temperature hydrocarbon addition device and a feedback control of the amount of the hydrocarbon supplied is conducted by using a NOx concentration downstream of the high-temperature NOx occlusion reduction type catalyst. In this case, the following effect can be achieved.

Specifically, a control optimum for each of the NOx occlusion reduction type catalysts can be conducted, and independent NOx reduction can be conducted in a temperature region suitable for each of the NOx occlusion reduction type catalysts. Hence, the NOx removal ratio can be improved and the HC slip can be reduced. Note that the upstream-side hydrocarbon addition device may be used instead of the high-temperature hydrocarbon addition device. In addition, the downstream-side NOx sensor may be used instead of the second NOx sensor.

According to the exhaust gas purification system and the exhaust gas purification method according to the present invention, the rise in temperature of exhaust gas in the high-temperature NOx occlusion reduction type catalyst at an early stage (upstream) causes the rise in temperature of the low-temperature NOx occlusion reduction type catalyst at a late stage (downstream), and the purification performance is improved. Hence, while a wide NOx active temperature window is achieved, the desulfurization of the NOx occlusion reduction type catalysts is facilitated, and the NOx reduction efficiency is improved by the partial oxidation of the hydrocarbon in the exhaust gas. Hence, high NOx removal performance can be obtained.

Moreover, the catalyzed DPF is disposed on the downstream side of the low-temperature NOx occlusion reduction type catalyst. Hence, the HC slip can be prevented in which the hydrocarbon is released to the air when the air-fuel ratio of the exhaust gas is in a rich state. In addition, the temperatures of the exhaust gas and the catalyzed DPF can be sufficiently raised at the PM regeneration, so that the combustion and removal of the PMs can be promoted.

In addition, the upstream side hydrocarbon supply device is provided. Hence, the decomposition of the hydrocarbon is promoted especially in the low-temperature region of the exhaust gas, and the NOx reduction efficiency can be improved.

DETAILED DESCRIPTION

Hereinafter, an exhaust gas purification system and an exhaust gas purification method of embodiments according to the present invention are described with reference to the drawings. Note that a state of an air-fuel ratio of exhaust gas herein does not necessarily mean a state of an in-cylinder air-fuel ratio, but refers to a ratio between the amount of air and the amount of fuel (including the amount of fuel combusted in the cylinder) supplied to exhaust gas flowing into a NOx occlusion reduction type catalyst.

Figure 1:
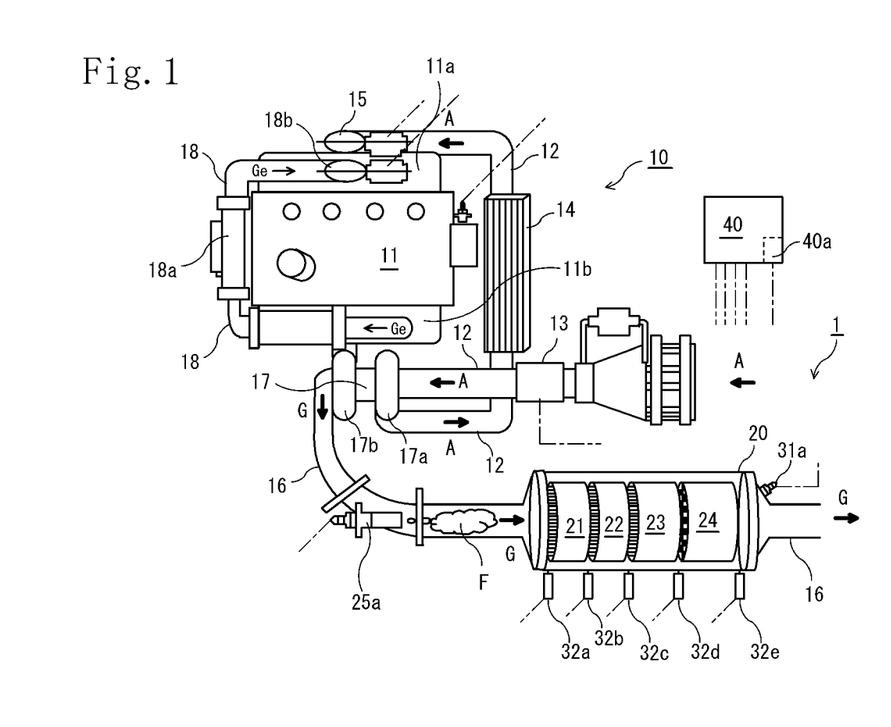
FIG. 1 shows a configuration of an exhaust gas purification system of a first embodiment according to the present invention.

FIG. 1 shows a configuration of an exhaust gas purification system 1 of a first embodiment according to the present invention. The exhaust gas purification system 1 includes an exhaust gas purification apparatus 20 in an exhaust passage 16 of an engine (internal combustion engine) 10.

The exhaust gas purification apparatus 20 includes an oxidation catalyst unit (DOC) 21 in which an oxidation catalyst is supported, a high-temperature catalyst unit 22 in which a high-temperature NOx occlusion reduction type catalyst having a NOx occlusion material containing an alkali metal is supported, a low-temperature catalyst unit 23 in which a low-temperature NOx occlusion reduction type catalyst having a NOx occlusion material containing an alkaline earth metal is supported, and a catalyzed DPF (catalyzed diesel particulate filter) unit 24 in which a catalyst is supported, which are disposed in series in this order from the upstream side.

Note that, regarding the arrangement of the oxidation catalyst, it is possible to employ a configuration in which the oxidation catalyst unit 21 is set on an upstream side of the high-temperature catalyst unit 22 as shown in FIG. 1, or a configuration in which the oxidation catalyst unit 21 is disposed on an upstream side of the high-temperature NOx occlusion reduction type catalyst unit 22 by zone coating in which portions of a catalyst layer in the high-temperature catalyst unit 22 are coated with different materials.

In addition, the high-temperature catalyst unit 22 and the low-temperature catalyst unit 23 may be disposed in a contact state or may be disposed in a state where a space is provided therebetween. An excessively large space is not preferable, because the exhaust gas is cooled in the space. On the other hand, in view of uniform flowing of the exhaust gas into the low-temperature catalyst unit 23, it is preferable to provide a certain space.

The high-temperature catalyst unit 22 is formed by a monolithic catalyst (honeycomb catalyst). The high-temperature NOx occlusion reduction type catalyst is formed by providing a catalyst coating layer on a supporting member of aluminum oxide (alumina), titanium oxide (titania), or zeolite, and supporting, on the catalyst coating layer, a catalytic metal and a occlusion material which occludes NOx when an air-fuel ratio of exhaust gas is in a lean state and releases the occluded NOx when the air-fuel ratio is in a rich state.

As the NOx occlusion material (NOx storage substance), an alkali metal such as potassium (K), sodium (Na), lithium (Li), rubidium (Rb), cesium (Cs), or francium (Fr) is used. The NOx occlusion performance of an alkali metal is not lowered at high temperature. An alkali metal having a higher molecular weight occludes a larger amount of NOx per mole. However, since an alkali metal having a higher molecular weight also has a larger weight, it occludes a smaller amount of NOx per weight. Considering the balance between the amount of NOx occluded per mole and the amount of NOx occluded per weight, it is preferable to use potassium, which has a moderate molecular weight among the alkali metals.

Meanwhile, examples of the catalytic metal used include platinum group elements (including oxides thereof) such as platinum (Pt), rhodium (Rh), palladium (Pd), and iridium (Ir), in general. In the present invention, platinum and rhodium are used. Here, the amount of potassium is set in a range from 4 times to 12 times the amount of platinum in terms of "g/L," and the mole ratio between platinum and rhodium supported is set in a range from 20:1 to 1:2.

Figure 4:
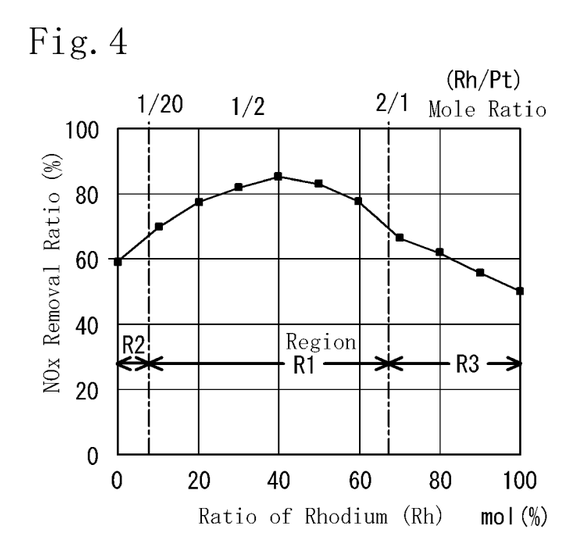
FIG. 4 is a graph of experimental results showing the relationship between the NOx removal ratio (%) and the ratio of the amount of rhodium supported relative to the total amount of platinum and rhodium supported in a high temperature-type catalyst.

FIG. 4 is a graph of experimental results showing the change in NOx removal ratio with the change in the ratio between platinum and rhodium supported in the high-temperature catalyst unit 22 (exhaust gas temperature: 200° C.). Note that, in the experiments, the amount of potassium was set to 6 times the amount of platinum in terms of "g/L."

Specifically, while the amount of potassium and the amount of platinum are being well balanced, the ratio between platinum and rhodium supported is set within an optimum range R1 where the NOx removal ratio is high (with the mole ratio being 1/20 to 2/1), as shown in FIG. 4. Thus, the amount of platinum supported whose NOx removal activity is inhibited by potassium or other alkali metal used as the occlusion material is set according to the amount of potassium supported which inhibits the NOx removal activity. Moreover, the amount of platinum supported and the amount of rhodium supported are set in an adjusted manner. Such a composition of the catalyst makes it possible to obtain high NOx removal performance, while reducing the amount of rhodium which increases the costs.

Note that the experimental results of FIG. 4 showing the change in NOx removal ratio with the change in the ratio between platinum and rhodium supported show that the NOx activity of the high-temperature NOx occlusion reduction type catalyst is lowered because of the influence of the poisoning of platinum by potassium in the region R2 where the ratio of rhodium supported is small and the ratio of platinum is large (with the mole ratio being less than 1/20). In addition, regarding the region R3 where the ratio of rhodium supported is large and the ratio of platinum is small (with the mole ratio being greater than 2/1), since the rhodium has poor low-temperature activity, the NOx activity is lowered with such a small amount of platinum.

Moreover, the sum of the amount of platinum supported and the amount of rhodium supported in the high-temperature catalyst 2 is set to 0.05 g/L or more and 5.0 g/L or less, and also the amount of platinum supported is set to 0.1 g/L or more and 3.0 g/L or less.

If the sum of the amount of platinum supported and the amount of rhodium supported is smaller than 0.05 g/L, the purification activity is insufficient. Meanwhile, if the sum is larger than 5.0 g/L, the effect is saturated, and the costs relative to the effect increase. On the other hand, if the amount of platinum supported is less than 0.1 g/L, the purification activity is insufficient. If the amount of platinum supported exceeds 3.0 g/L, the costs relative to the effect increase.

Moreover, cerium (Ce) is supported in the high-temperature catalyst 2, and the amount of cerium supported is set to 0.1 g/L or more and 2.0 g/L or less. This is because if the amount of cerium supported is smaller than 0.1 g/L, the oxygen storage/release effect is poor, while if the amount of cerium supported exceeds 2.0 g/L, the rich depth is reduced.

This configuration in which cerium is supported enables occlusion and release of oxygen. Hence, the difference in oxygen concentration between the lean state and the stoichiometric or rich state is reduced, so that the three-way activity is readily expressed, and the purification performance is improved. Note that an experiment showed that the NOx removal ratio was higher in a case where cerium was supported than in a case where no cerium was supported.

Next, the low-temperature catalyst unit 23 is described. As same as in the case of the high-temperature catalyst 22, the low-temperature catalyst unit 23 is formed of a monolithic catalyst, and a low-temperature NOx occlusion reduction type catalyst is supported. This low-temperature NOx occlusion reduction type catalyst is formed by providing a catalyst coating layer on a supporting member of aluminum oxide, titanium oxide, or the like, and supporting a NOx occlusion material and a catalytic metal on the catalyst coating layer.

In contrast to the high-temperature NOx occlusion reduction type catalyst, an alkaline earth metal, whose NOx occlusion performance is not lowered at low temperature, such as barium (Ba), beryllium (Be), magnesium (Mg), calcium (Ca), or strontium (Sr) is used as the NOx occlusion material (NOx occlusion substance). In addition, the NOx removal activity of the catalytic metal is not inhibited by an alkali metal in contrast to the case of the high-temperature NOx occlusion reduction type catalyst. Hence, a platinum group element (which may be an oxide thereof) such as platinum (Pt), rhodium (Rh), palladium (Pd), or iridium (Ir) is used as the catalytic metal.

Meanwhile, the engine 10 includes an engine main body 11, an intake passage 12 connected to an intake manifold 11a of the engine main body 11, the exhaust passage 16 connected to an exhaust manifold 11b, and an exhaust gas recirculation ("EGR") passage 18.

In the intake passage 12 through which intake air A passes, an intake air mass flow sensor (MAF) 13, a compressor 17a of a turbocharger 17, an intercooler 14, an intake valve 15, and the like are provided in this order from the upstream side. Meanwhile, in the exhaust passage 16 through which exhaust gas G passes, a turbine 17b of the turbocharger 17, a HC injection nozzle (upstream-side hydrocarbon addition device) 25a, and the exhaust gas purification apparatus 20 are provided. Moreover, in the EGR passage 18 through which EGR gas Ge passes, an EGR cooler 18a and an EGR valve 18b are provided.

Moreover, in the exhaust gas purification system 1 of FIG. 1, a downstream-side NOx sensor 31a is provided in a rear portion of the exhaust gas purification apparatus 20, in addition to the hydrocarbon injection nozzle (upstream-side hydrocarbon addition device) 25a provided upstream of the high-temperature catalyst unit 22.

In addition, a first temperature sensor 32a is provided upstream of the oxidation catalyst unit 21, and a second temperature sensor 32b is provided between the oxidation catalyst unit 21 and the high-temperature catalyst unit 22. A third temperature sensor 32c is provided between the high-temperature catalyst unit 22 and the low-temperature catalyst unit 23, and a fourth temperature sensor 32d is provided between the low-temperature catalyst unit 23 and the catalyzed DPF unit 24. A fifth temperature sensor 32e is provided downstream of the catalyzed DPF unit 24.

In addition, a hydrocarbon supply control device (hydrocarbon supply control device) 40a is provided which controls the amount of the hydrocarbons, which are supplied through the hydrocarbon injection nozzle 25a provided upstream of the high-temperature catalyst unit 22, by using a value detected by the downstream-side NOx sensor 31a disposed downstream of the low-temperature catalyst unit 23. In general, the hydrocarbon supply control device 40a is integrated in a controlling device 40 which performs the general control of the engine and which is called an engine control unit (ECU).

The above-described configuration makes it possible to obtain high NOx removal performance for the following reasons. Specifically, an alkali metal is used as the occlusion material in the high-temperature catalyst unit 22 to improve the high-temperature activity. In addition, rhodium is supported, while the amount of platinum supported whose NOx removal activity is inhibited by the alkali metal, is reduced, and the ratio between platinum and rhodium supported is set within an optimum range.

Moreover, in the high-temperature catalyst unit 22 at the early stage (on the upstream side), the activity in the reaction from nitrogen monoxide to nitrogen dioxide at low temperature is increased, and the occlusion performance is improved, because of the rhodium which has a high oxidation activity. In addition, because of the rhodium having a high oxidation activity, the partial oxidation of hydrocarbons is promoted even at extremely low temperature, and the partial oxides generated by the partial oxidation and serving as a good reducing agent for NOx removal greatly improve the extremely low-temperature performance of the low-temperature catalyst unit 23 at a late stage (on the downstream side). Moreover, since the rise in the temperature of the exhaust gas in the high-temperature catalyst unit 22 at the early stage leads to the rise in temperature of the low-temperature catalyst unit 23 at the late stage, the purification performance is improved.

Accordingly, the exhaust gas purification system 1 of the present invention in which the high-temperature NOx occlusion reduction type catalyst (the high-temperature catalyst unit 22) is disposed at the early stage and the low-temperature NOx occlusion reduction type catalyst (the low-temperature catalyst unit 23) is disposed at the late stage, serves as an exhaust gas purification system which achieves an improved purification ratio even in a low-temperature region of 150° C., and has a wide NOx active temperature window.

A reason for the improvement in purification performance at low temperature is presumably the promotion of improvement in performance of the low-temperature NOx occlusion reduction type catalyst at the late stage, due to the improvement in occlusion performance owing to the promotion of the activity in the reaction "NO→NO$_2$" at low temperature with the high-temperature NOx occlusion reduction type catalyst at the early stage, due to the improvement in reduction performance owing to the partial oxidation effect of the reducing agent by the reaction "HC→CO" at low temperature with the high-temperature NOx occlusion reduction type catalyst at the early stage, and due to the improvement in purification performance owing to the rise in temperature of the low-temperature NOx occlusion reduction type catalyst at the late stage by rising the temperature of the exhaust gas in the high-temperature NOx occlusion reduction type catalyst at the early stage, and the like.

In addition, an experiment showed that exhaust gas was purified in a high-temperature region only by the function of the high temperature-type catalyst 22 at a substantially early stage, on the basis of a value detected by a NOx sensor following to the high temperature-type catalyst 22. For this reason, characteristics of the high temperature-type catalyst 22 at the early stage are especially important in the high-temperature region.

Incidentally, the arrangement of the present invention is changed, so that the low-temperature NOx occlusion reduction type catalyst is disposed at the early stage, and the high-temperature NOx occlusion reduction type catalyst is disposed at the late stage, the performances at low and high temperatures are lowered. Reasons for this are presumably as follows. Specifically, in the low-temperature region, the above-described effect of the low-temperature NOx occlusion reduction type catalyst on the upstream side is lost. In the high-temperature region, the reducing agent is consumed by the low-temperature NOx occlusion reduction type catalyst at the early stage, and hence the reducing function of the high-temperature NOx occlusion reduction type catalyst at the late stage is impaired. In addition, the rise in temperature of the exhaust gas impairs the occlusion function of the high-temperature NOx occlusion reduction type catalyst at the late stage.

In the configuration of the exhaust gas purification system 1 of FIG. 1, the oxidation catalyst (DOC) unit 21 is disposed on the upstream side of the high-temperature catalyst unit 22 of the high-temperature NOx occlusion reduction type catalyst. Thus, the exhaust gas G can be purified by allowing the exhaust gas G to pass through the oxidation catalyst of the oxidation catalyst unit 21, then through the high-temperature NOx occlusion reduction type catalyst in which the NOx occlusion material containing the alkali metal is supported, of the high-temperature catalyst unit 22, and then through the low-temperature NOx occlusion reduction type catalyst in which the NOx occlusion material containing the alkaline earth metal is supported, of the low-temperature catalyst unit 23.

The exhaust gas purification system and the exhaust gas purification method enable oxygen in the exhaust gas G to be consumed in the oxidation catalyst unit 21, so that the entire exhaust gas G flowing into the high-temperature catalyst unit 22 and the low-temperature catalyst unit 23 can be placed in a rich atmosphere which enables desulfurization. For this reason, the desulfurization is promoted in the high-temperature catalyst unit 22 and in the low-temperature catalyst unit 23, and consequently desulfurization of both the high-temperature catalyst unit 22 and the low-temperature catalyst unit 23 is facilitated, and the NOx reduction efficiency can be improved by the partial oxidation of hydrocarbons.

Note that, considering the rich reduction, it is necessary to deliver the reducing agent such as hydrocarbons to the high-temperature catalyst unit 22 and the low-temperature catalyst unit 23. Hence, it is preferable that the HC oxidation performance of the oxidation catalyst in the oxidation catalyst unit 21 be not so high. The configuration with the arrangement in FIG. 1 makes it possible to reduce the amount of the noble metal supported in the oxidation catalyst unit 21, and is advantageous in terms of costs. Moreover, the composition of the oxidation catalyst supported in the oxidation catalyst unit 21 can be adjusted to be specialized for the partial oxidation of hydrocarbons, and made more suitable for the rich reduction, so that the reduction efficiency especially at low temperature can be improved.

In addition, in the configuration of the exhaust gas purification system 1 of FIG. 1, the catalyzed DPF unit 24 is disposed on the downstream side of the low-temperature catalyst unit 23. Hence, the exhaust gas G having passed through the low-temperature NOx occlusion reduction type catalyst of the low-temperature catalyst unit 23 can be allowed to pass through the catalyzed DPF unit 24. Therefore, the exhaust gas purification system 1 and the exhaust gas purification method can achieve the following effects.

The catalyzed DPF unit 24 has a function to remove hydrocarbons in the exhaust gas G owing to an HC oxidation function of a noble metal and an HC adsorption function of an HC adsorption material such as zeolite or ceria. Hence, the HC slip can be prevented in which hydrocarbons are released to the air when the air-fuel ratio of the exhaust gas G is in a rich state. In addition, the oxidation catalyst unit 21, the high-temperature catalyst unit 22 including the NOx occlusion reduction type catalyst, and the low-temperature catalyst unit 23 including the NOx occlusion reduction type catalyst are present upstream of the catalyzed DPF unit 24. Hence, the heat generated at these catalysts, in total, can sufficiently raise the temperature of the exhaust gas G. Consequently, the temperature can be sufficiently raised by the heat of oxidation of hydrocarbons at the PM regeneration where PMs (particulate matters) trapped by the catalyzed DPF unit 24 are combusted and removed.

Moreover, in the exhaust gas purification system 1 of FIG. 1, the hydrocarbon injection nozzle (upstream-side hydrocarbon addition device) 25a is provided upstream of the high-temperature catalyst unit 22, and the downstream-side NOx sensor 31a is disposed downstream of the low-temperature catalyst unit 23. Hence, when hydrocarbons are supplied through the hydrocarbon injection nozzle 25a provided upstream of the high-temperature catalyst unit 22, and the amount of the hydrocarbon supplied is being controlled by using a value detected by the downstream-side NOx sensor 31a disposed downstream of the low-temperature catalyst unit 23. In this case, the following effects can be achieved.

A reducing agent, which is hydrocarbons, can be supplied through the upstream-side hydrocarbon injection nozzle 25a during a rich control to improve the NOx reduction efficiency in each of the high-temperature catalyst unit 22 and the low-temperature catalyst unit 23. And hydrocarbons can be supplied during the PM regeneration of the catalyzed DPF unit 24 to raise the temperature of the catalyst supported in the catalyzed DPF unit 24 by the heat of oxidation of the hydrocarbons, and to promote the combustion of the PMs. Especially in a low-temperature region, the reduction efficiency can be improved by promoting the decomposition of hydrocarbons.

In addition, regarding the addition of the hydrocarbons (light oil: fuel) F through the upstream-side hydrocarbon injection nozzle 25*a*, even when the hydrocarbons F are injected directly into the exhaust gas G, it takes time before drops of the liquid of the hydrocarbons F are gasified and undergo phase transition to HC species readily used as a reducing agent in the catalyst especially in the low-temperature region (approximately 230° C. or below). Hence, by employing the two-stage arrangement including the high-temperature catalyst unit 22 and the low-temperature catalyst unit 23, the hydrocarbons F can pass through the oxidation catalyst unit 21 and the high-temperature catalyst unit 22 before reaching the low-temperature catalyst unit 23. Hence, the hydrocarbons F are in contact with the catalysts for a relatively long time, so that a sufficient time for the hydrocarbons F to be gasified can be provided reliably.

Consequently, NOx can be reduced even at relatively low temperature (approximately 200° C. to 230° C.), and this is advantageous in that a certain purification ratio can be easily obtained. In addition, since the NOx concentration after the exhaust gas purification apparatus (catalyst system) 20 can be measured with the downstream-side NOx sensor 31*a*, the NOx concentration can be used for a rich control or for diagnosis with the on-board diagnostic system.

Figure 2:
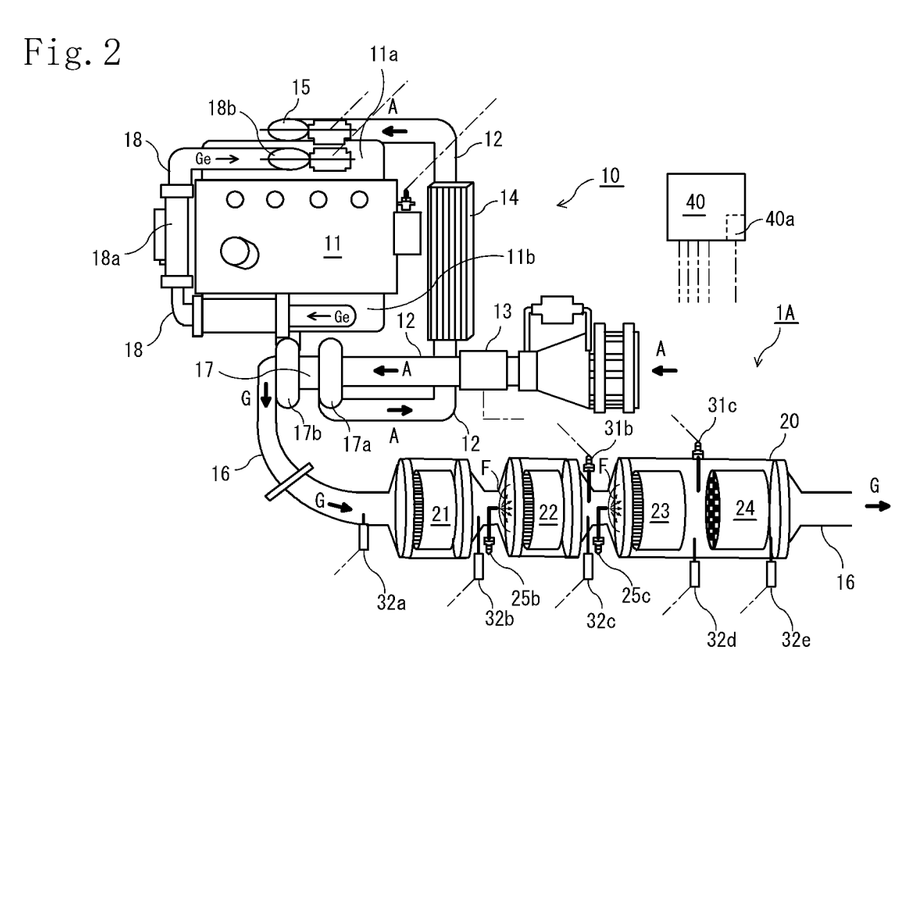
FIG. 2 shows a configuration of an exhaust gas purification system of a second embodiment according to the present invention.
Figure 3:
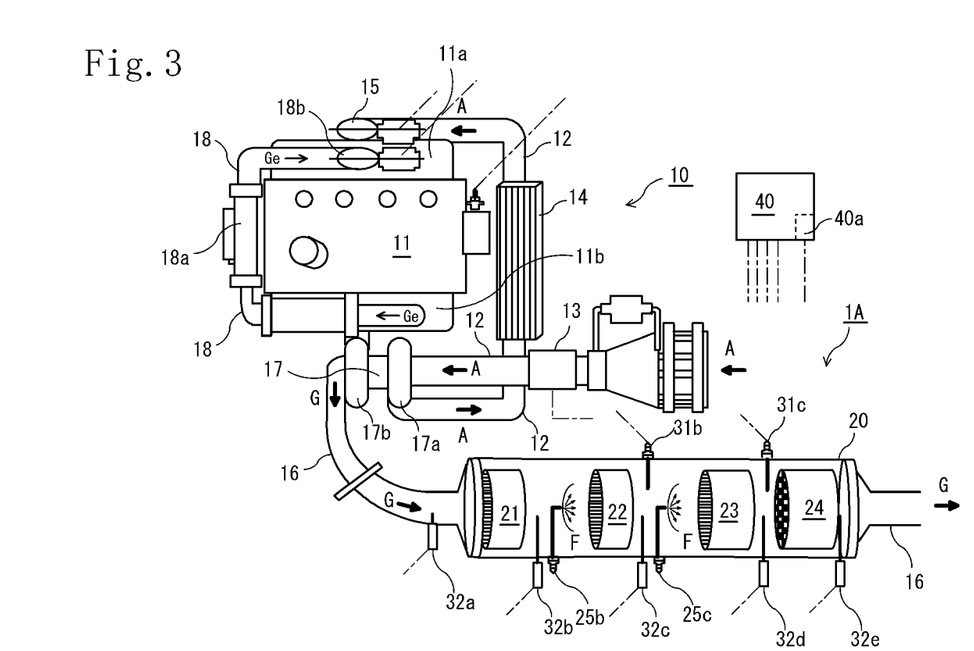
FIG. 3 shows another configuration of the exhaust gas purification system of the second embodiment according to the present invention.

Next, an exhaust gas purification system 1A and an exhaust gas purification method of a second embodiment according to the present invention shown in FIG. 2 and FIG. 3 are described. Note that, in a configuration of FIG. 2, a case for accommodating the oxidation catalyst unit 21, a case for accommodating the high-temperature catalyst unit 22, and a case for accommodating the low-temperature catalyst unit 23 and the catalyzed DPF unit 24 are formed separately from each other. In contrast, in a configuration of FIG. 3, all the four units 21, 22, 23, and 24 are accommodated in a single case.

In the exhaust gas purification system 1A of the second embodiment, a high-temperature hydrocarbon injection nozzle (high-temperature hydrocarbon addition device) 25*b* is disposed on the upstream side of the high-temperature catalyst unit 22 in which the high-temperature NOx occlusion reduction type catalyst is supported, and a low-temperature hydrocarbon injection nozzle (low-temperature hydrocarbon addition device) 25*c* is disposed between the high-temperature catalyst unit 22 and the low-temperature catalyst unit 23 in which the low-temperature NOx occlusion reduction type catalyst is supported.

Moreover, a first NOx sensor 31*b* is provided immediately after the high-temperature catalyst unit 22, and a second NOx sensor 31*c* is provided immediately after the low-temperature catalyst unit 23. In addition, the hydrocarbon supply control device (hydrocarbon supply control device) 40*a* is provided for controlling the high-temperature hydrocarbon injection nozzle 25*b* and the low-temperature hydrocarbon injection nozzle 25*c*. In general, the hydrocarbon supply control device 40*a* is integrated in the controlling device 40 which performs the general control of the engine and which is called an engine control unit (ECU). The hydrocarbon supply control device 40*a* is configured to conduct the following hydrocarbon supply control.

Specifically, when a temperature Tg of the exhaust gas G is lower than a first determination temperature Tg1, hydrocarbons F are supplied only through the low-temperature hydrocarbon injection nozzle 25*c* and a feedback control of the amount of the hydrocarbons F supplied is conducted by using a value detected by the second NOx sensor 31*c*.

Meanwhile, when the temperature Tg of the exhaust gas G is not lower than the first determination temperature Tg1 but is lower than a second determination temperature Tg2, hydrocarbons F are supplied through the high-temperature hydrocarbon injection nozzle 25*b* and a feedback control of the amount of the hydrocarbons F supplied is conducted by using a value detected by the first NOx sensor 31*b*, and also hydrocarbons F are supplied through the low-temperature hydrocarbon injection nozzle 25*c* and a feedback control of the amount of the hydrocarbons F supplied is conducted by using a value detected by the second NOx sensor 31*c*.

Meanwhile, when the temperature Tg of the exhaust gas G is not lower than the second determination temperature Tg2, hydrocarbons F are supplied only through the high-temperature hydrocarbon injection nozzle 25*b* and a feedback control of the amount of the hydrocarbons F supplied is conducted by using a value detected by the first NOx sensor 3*b*.

In addition to the effects achieved by the exhaust gas purification system 1 and the exhaust gas purification method of the first embodiment, the exhaust gas purification system 1A and exhaust gas purification method of the second embodiment make it possible to conduct a control optimum for each of the NOx occlusion reduction type catalysts, and independent NOx reduction in a temperature region suitable for each of the NOx occlusion reduction type catalysts. Hence, the purification ratio can be further improved and the HC slip can be further reduced.

Note that the upstream-side hydrocarbon injection nozzle 25*a* in FIG. 1 may be used instead of the high-temperature hydrocarbon injection nozzle 25*b* in FIG. 2 and FIG. 3, and the downstream-side NOx sensor 31*a* in FIG. 1 may be used instead of the second NOx sensor 31*c* in FIG. 2 and FIG. 3.

In the exhaust gas purification system and the exhaust gas purification method of the present invention, the compositions and arrangement (lay out) of the NOx occlusion reduction type catalysts are designed with ingenuity. Hence, while a wide NOx active temperature window is achieved, the desulfurization of the NOx occlusion reduction type catalysts is facilitated, and the NOx reduction efficiency can be improved by the partial oxidation of hydrocarbons in the exhaust gas. Therefore, the exhaust gas purification system and the exhaust gas purification method of the present invention can be used as an exhaust gas purification system and an exhaust gas purification method for internal combustion engines such as diesel engines mounted on automobiles.

The invention claimed is:

1. An exhaust gas purification system, comprising:
   NOx occlusion reduction type catalysts, each having a catalytic metal and a NOx occlusion material which occludes NOx when an air-fuel ratio of exhaust gas is in a lean state and releases the occluded NOx when the air-fuel ratio is in a rich state,
   wherein the NOx occlusion reduction type catalysts include a high-temperature NOx occlusion reduction type catalyst in which a NOx occlusion material containing an alkali metal is supported, and a low-temperature NOx occlusion reduction type catalyst in which a NOx occlusion material containing an alkaline earth metal is supported, disposed in series on an upstream side and a downstream side, respectively;
a hydrocarbon injector on an upstream side of the high-temperature NOx occlusion reduction type catalyst;
a first NOx sensor between the high-temperature NOx occlusion reduction type catalyst and the low-temperature NOx occlusion reduction type catalyst;
a second NOx sensor downstream of the low-temperature NOx occlusion reduction type catalyst; and
a hydrocarbon supply controller configured to provide—
when a temperature of the exhaust gas flowing into the high-temperature NOx occlusion reduction type catalyst is lower than a first determination temperature, feed-back control of hydrocarbon supplied from the hydrocarbon addition device based on a value detected by the second NOx sensor, and
when the temperature of the exhaust gas flowing into the high-temperature NOx occlusion reduction type catalyst is not lower than a second determination temperature that is higher than the first determination temperature, feed-back control of the hydrocarbon supplied from the hydrocarbon addition device based on a value detected by the first NOx sensor;
wherein the hydrogen addition device is a high-temperature hydrocarbon injector on the upstream side of the high-temperature NOx occlusion reduction type catalyst; and
a low-temperature hydrocarbon injector between the high-temperature NOx occlusion reduction type catalyst and the low-temperature NOx occlusion reduction type catalyst,
wherein the hydrocarbon supply controller controls the high-temperature hydrocarbon addition device and the low-temperature hydrocarbon addition device to supply—
when the temperature of the exhaust gas flowing into the high-temperature NOx occlusion reduction type catalyst is lower than the first determination temperature, the hydrocarbon only from the low-temperature hydrocarbon injector and feedback control of an amount of the hydrocarbon supplied is conducted by using a value detected by the second NOx sensor, and
when the temperature of the exhaust gas flowing into the high temperature NOx occlusion reduction type catalyst is not lower than the second determination temperature, the hydrocarbon only from the high-temperature hydrocarbon injector, and feedback control of the amount of the hydrocarbon supplied is conducted by using a value detected by the first NOx sensor.

2. The exhaust gas purification system according to claim 1, further comprising:
a catalyzed diesel particulate filter on a downstream side of the low-temperature NOx occlusion reduction type catalyst.

3. The exhaust gas purification system according to claim 2, further comprising:
an oxidation catalyst on an upstream side of the high temperature NOx occlusion reduction type catalyst.

4. The exhaust gas purification system according to claim 1, further comprising:
an oxidation catalyst on an upstream side of the high-temperature NOx occlusion reduction type catalyst.

5. An exhaust gas purification method, comprising:
purifying exhaust gas in a NOx purification system including NOx occlusion reduction type catalysts, each having a catalytic metal and a NOx occlusion material which occludes NOx when an air-fuel ratio of exhaust gas is in a lean state and releases the occluded NOx when the air-fuel ratio is in a rich state,
wherein the purifying includes passing the exhaust gas through a high-temperature NOx occlusion reduction type catalyst in which a NOx occlusion material containing an alkali metal is supported, and then through a low-temperature NOx occlusion reduction type catalyst in which a NOx occlusion material containing an alkaline earth metal is supported; and
supplying hydrocarbon upstream of the high-temperature NOx occlusion reduction type catalyst,
wherein,
when a temperature of the exhaust gas flowing into the high-temperature NOx occlusion reduction type catalyst is lower than a first determination temperature, feedback controlling the hydrocarbon supplied based on a NOx concentration detected downstream of the lower-temperature NOx occlusion reduction type catalyst, and
when the temperature of the exhaust gas flowing into the high-temperature NOx occlusion reduction type catalyst is not lower than a second determination temperature that is higher than the first determination temperature, feedback controlling the hydrocarbon supplied based on a NOx concentration detected between the high-temperature NOx occlusion reduction type catalyst and the low-temperature NOx occlusion reduction type catalyst, and
wherein
when the temperature of the exhaust gas flowing into the high-temperature NOx occlusion reduction type catalyst is lower than the first determination temperature, the hydrocarbon is supplied only from a low-temperature hydrocarbon injector between the high-temperature NOx occlusion reduction type catalyst and the low-temperature NOx occlusion reduction type catalyst, and feedback control of an amount of the hydrocarbon supplied is conducted by using a NOx concentration detected downstream of the low-temperature NOx occlusion reduction type catalyst, and
when the temperature of the exhaust gas flowing into the high-temperature NOx occlusion reduction type catalyst is not lower than the first determination temperature, but is lower than a second determination temperature, the hydrocarbon is supplied from a high-temperature hydrocarbon injector on an upstream side of the high-temperature NOx occlusion reduction type catalyst and feedback control of the amount of the hydrocarbon supplied is conducted by using a NOx concentration detected downstream of the high-temperature NOx occlusion reduction type catalyst.

6. The exhaust gas purification method according to claim 5, further comprising:
passing the exhaust gas through the low-temperature NOx occlusion reduction type catalyst and through a catalyzed diesel particulate filter.

7. The exhaust gas purification method according to claim 6, further comprising:
passing the exhaust gas through an oxidation catalyst, then through the high-temperature NOx occlusion reduction type catalyst.

8. The exhaust gas purification method according to claim 5, further comprising:
    passing the exhaust gas through an oxidation catalyst, then through the high temperature NOx occlusion reduction type catalyst.

* * * * *